United States Patent
Krempl et al.

(10) Patent No.: US 7,782,218 B2
(45) Date of Patent: Aug. 24, 2010

(54) DEVICE AND METHOD FOR DETECTING SEAT OCCUPANCY

(75) Inventors: Michael Krempl, Ergoldsbach (DE); Gerhard Wild, Regensburg (DE); Jürgen Zacherl, Donaustauf (DE)

(73) Assignee: Continental Automotive GmbH, Munich (DE)

( * ) Notice: Subject to any disclaimer, the term of this patent is extended or adjusted under 35 U.S.C. 154(b) by 322 days.

(21) Appl. No.: 11/917,007

(22) PCT Filed: May 31, 2006

(86) PCT No.: PCT/EP2006/062793

§ 371 (c)(1), (2), (4) Date: Dec. 10, 2007

(87) PCT Pub. No.: WO2006/131483

PCT Pub. Date: Dec. 14, 2006

(65) Prior Publication Data

US 2008/0204263 A1 Aug. 28, 2008

(30) Foreign Application Priority Data

Jun. 10, 2005 (DE) .................. 10 2005 027 041

(51) Int. Cl.
    *G08B 21/00* (2006.01)
(52) U.S. Cl. .............. 340/667; 340/665; 340/666; 701/45; 702/173
(58) Field of Classification Search .............. 340/667, 340/665, 666; 180/272, 273; 280/735; 701/45, 701/49; 702/41, 173; 73/862.041, 862.042
    See application file for complete search history.

(56) References Cited

U.S. PATENT DOCUMENTS

| 6,056,079 A * | 5/2000 | Cech et al. ............... 180/273 |
| 6,323,443 B1 | 11/2001 | Aoki et al. |
| 6,348,663 B1 * | 2/2002 | Schoos et al. ............ 177/144 |
| 6,522,155 B2 | 2/2003 | Pietsch et al. |
| 7,046,158 B2 * | 5/2006 | Saunders et al. ........... 340/666 |
| 7,049,830 B1 | 5/2006 | Thinnes |
| 2001/0040056 A1 | 12/2001 | Schoos et al. |
| 2003/0060957 A1 * | 3/2003 | Okamura et al. ............ 701/45 |
| 2003/0220766 A1 | 11/2003 | Saunders et al. |
| 2004/0243295 A1 * | 12/2004 | Fischer et al. ............. 701/45 |
| 2006/0150752 A1 | 7/2006 | Lorenz et al. |

FOREIGN PATENT DOCUMENTS

DE 19925877 A1 1/2000

(Continued)

OTHER PUBLICATIONS

Billen et al.: "Occupant Classification System for Smart Restraint Systems", IEEE International Electronics & Engineering, Luxembourg, XP-002184965, pp. 33-38, 1999.

*Primary Examiner*—Hung T. Nguyen
(74) *Attorney, Agent, or Firm*—Laurence A. Greenberg; Werner H Stemer; Ralph E Locher

(57) ABSTRACT

A device and a method for detecting seat occupancy, with the device including first and second sensor elements associated with a respective seat surface. First and second weight-dependent sensor signals are electrically obtainable from the sensor elements. The seat occupancy is determined by taking either the first or the second sensor signals in dependence on an ambient temperature.

14 Claims, 3 Drawing Sheets

FOREIGN PATENT DOCUMENTS

| | | |
|---|---|---|
| DE | 199 47 733 B4 | 8/2001 |
| DE | 10144878 A1 | 9/2002 |
| DE | 10163830 A1 | 7/2003 |
| EP | 1210571 B1 | 6/2002 |
| WO | 0118515 A1 | 3/2001 |
| WO | 2005000637 A1 | 1/2005 |
| WO | 2006072551 A1 | 7/2006 |

* cited by examiner

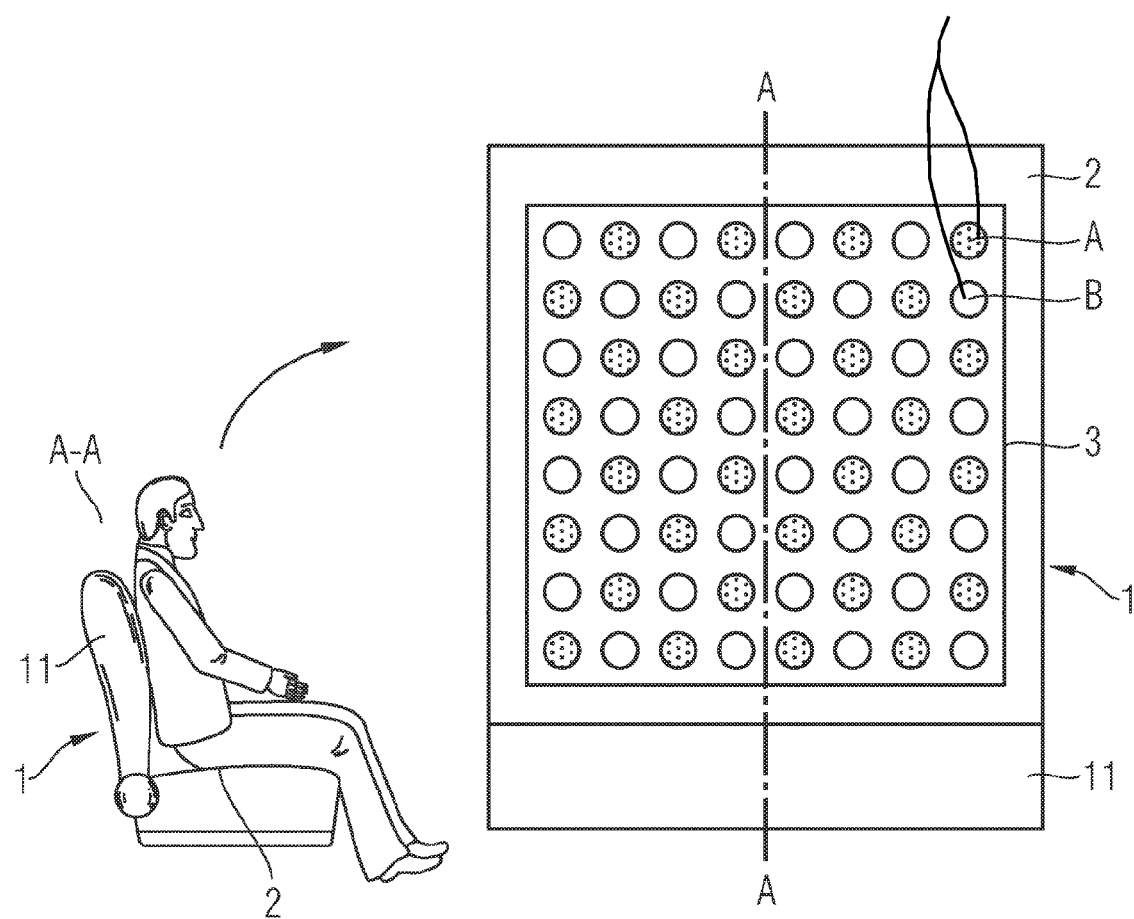
FIG. 1
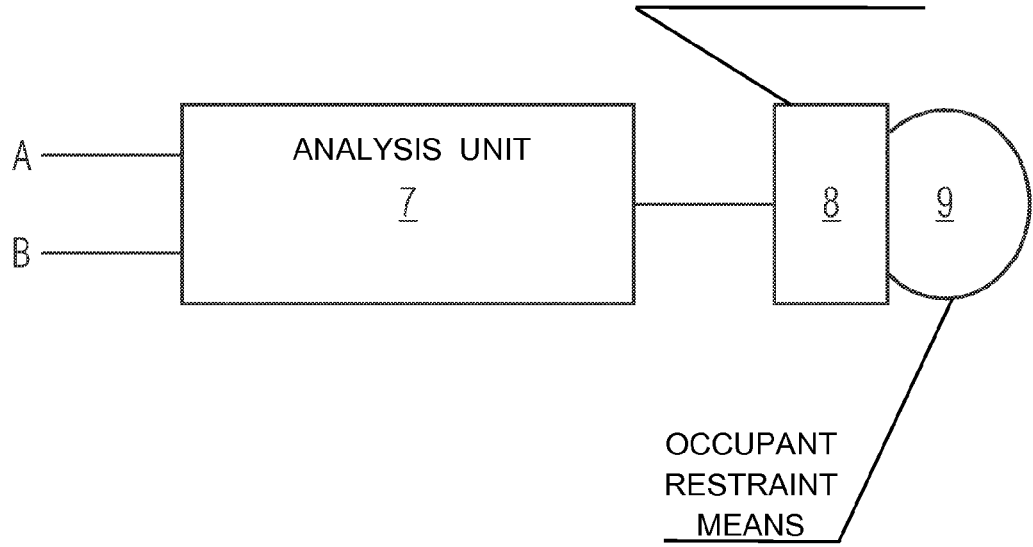

DEVICE AND METHOD FOR DETECTING SEAT OCCUPANCY

BACKGROUND OF THE INVENTION

Field of the Invention

The invention relates to a device and method for detecting seat occupancy. For this purpose the device has first and second sensor elements, which are assigned in each case to a surface of a seat and at which first and second sensor signals can be tapped off electrically, said sensor signals being dependent in each case on the weight force applied to the associated sensor elements. The method employs a device of this kind.

With a multiplicity of technical applications today it is important to acquire information about the type of occupancy of a seat in order to make corresponding follow-up functions dependent thereon.

This applies to a particular extent to occupant restraint systems, whose efficient, i.e. avoiding physical injury, and cost-conscious deployment of occupant restraint means is often dependent on the type of seat occupancy of the vehicle seat. In this area in particular it has become increasingly important in the last several years to adapt the deployment of occupant restraint means, for example front airbags, side airbags, knee airbags, curtain airbags, etc., according to a vehicle occupant situated in the deployment zone of the occupant restraint means in order, on the one hand, to save on repair costs and, in the event that a seat is not occupied, prevent an occupant restraint means from being deployed at the outset, and, on the other hand, not to place certain groups of people, for example children or very small adults, at additional risk due to an inappropriate deployment behavior of the occupant restraint means.

In this case it is often important not only to establish the presence of a person on the motor vehicle seat, but in addition to determine classifying characteristics of the person, in particular the body weight. Reference should be made in this context to the crash standard FMVSS 208, compliance with which is increasingly demanded of automobile manufacturers and which specifies a classification of a person according to his/her weight so that in the event of a collision the activation of an occupant restraint means can be modified if necessary in a suitable manner to match the person detected.

The weight or the weight distribution of a person on a motor vehicle seat can be measured with the aid of different sensors:

It is known from the unexamined German application DE 199 25 877 A1, for example, to measure the weight of a vehicle occupant together with his/her vehicle seat by means of load sensors disposed between the vehicle seat and the vehicle floor. The sensors used in this arrangement can for example apply capacitive measurement principles (column 7, line 30). However, inductive or piezoresistive or other weight sensors, for example, can also be used. Moreover, systems having transmitting and receiving units for ultrasound, infrared or microwaves, for example, are also used for occupant detection.

The use of weight-sensitive resistance elements as sensor elements for seat occupancy detection in particular in motor vehicles is sufficiently known from automotive engineering: It is known from the publication DE 200 14 200 U1, for example, to use what is termed a sensor seat mat for seat occupancy detection in a motor vehicle, which sensor seat mat consists of a plurality of pressure-sensitive sensor elements. The latter are arranged in a distributed manner over the seating surface of the vehicle seat and consequently can measure the force applied to the seating surface by a person sitting on the vehicle seat or an object placed on the vehicle seat. The sensor elements are resistance elements which vary their resistance as a function of the weight acting upon them. Said variations in resistance can be individually tapped off at the resistance elements as weight-dependent sensor signals. By interpreting the sensor signals in an analysis unit it is thus possible to generate a seating profile on the basis of which a conclusion can be drawn about the sitting position of a vehicle occupant, but also about objects which have been placed on the seat.

The unexamined United States application US 2001/0040056 A1 reveals several embodiments of a similar arrangement, except that in this case, compared to the subject matter of the publication DE 200 14 200 U1, the sensor signals cannot be tapped off at each sensor element, but can only be detected as a total signal of one or more networks of resistance elements interconnected in parallel.

Regardless of whether sensor elements are used individually or as one or more networks of interconnected sensor elements, a value referred to as a triggering threshold value can be defined for the signal analysis. If the summation signal or individual signal of the sensor elements exceeds this triggering threshold value, the sensor elements are triggered, which is to say that the sensor elements are considered to be occupied, by a person for example.

Variable resistors varying as a function of weight for use as sensor elements are typically introduced between two laminated carrier films. In this configuration the sensor elements enclose a cavity into which conductive layers facing each other and arranged on the films are introduced, said layers approaching each other when pressure is applied thereto and, as the pressure is increased further, finally make surface-to-surface contact with each other such that as a result a pressure-dependent variation in the electrical resistance between two contacts can be tapped off at the sensor elements.

However, due to such a design or a similar arrangement of the sensor elements and due to their being installed on or in the motor vehicle seat, the response characteristics of the weight-sensitive resistance elements change according to the ambient temperature, with the result that when a constant weight is exerted the sensor signals vary within the temperature range in which the occupant detection device is intended to be used.

Usually the sensor signals are lower at low ambient temperatures than at high temperatures. This can lead to the following problems: based on the sensor signals at very low, in particular negative, temperatures, the device for detecting seat occupancy may no longer be able to detect a person sitting on the motor vehicle seat, in particular in the case of very lightweight individuals. Conversely, at higher temperatures a person may incorrectly be detected on the vehicle seat even though there is nobody sitting there. This can be caused for example even by a tightly stretched seat cover. A case such as this is referred to as an initial load, which, although measured, is not caused by a weight bearing on the sensor elements.

A common consequence of these two conflicting sets of problems is that due to such temperature-dependent sensor signals, the seat occupancy detection system is not able to provide optimal seat occupancy detection across the entire temperature range, typically between −40 and +85 degrees Celsius.

EP 1 210 571 B1 (cf. [0018]-[0024]) discloses a seat occupancy detection device having first and second sensor elements which are distributed over the surface of a seat and at which first and second sensor signals can be tapped off electrically, said sensor signals being dependent in each case on the weight force applied to the sensor elements. It is further known from EP 1 210 571 B1 that temperature effects can be compensated for by means of at least one second sensor element.

DE 199 47 733 B4 ([0016]-[0020]) discloses a device in which the temperature is also taken into account in the evaluation of the output signal of the seat sensor elements by means of a neural network.

Also known from DE 101 44 878 A1 (FIG. 1; [0015]-[0016]) is a device in which the signals of the seat sensors can be corrected by means of an external temperature sensor.

BRIEF SUMMARY OF THE INVENTION

The object of the present invention is therefore to provide a device and a method for seat occupancy detection so that seat occupancy detection will be as reliable as possible over as wide a temperature range as possible.

This object is achieved by a seat occupancy detection device having first and second sensor elements which are assigned to a surface of a seat and at which first and second sensor signals respectively can be tapped off electrically, said sensor signals being dependent in each case on the weight force applied to the associated sensor elements. According to the invention the device includes a selection circuit for ambient-temperature-dependent selection of first and/or second sensor signals for detecting seat occupancy. This allows the use of the types of first and second sensor elements that are best suited in each case for application in different temperature ranges in which the device must deploy its full functional capability. According to temperature range, the selection circuit selects for this purpose as a function of the ambient temperature either the first or the second sensor signals for detecting seat occupancy, depending on which of these signals is most likely to provide the most reliable detection of an occupant in the respective temperature range. Optionally, in such ambient temperature ranges in which a reliable detection of an occupant is likely based on both the first and the second sensor signals, it is also possible to use both sensor signals for detecting seat occupancy.

The selection circuit can be embodied as an electronic circuit. Preferably, however, it is embodied at least in part, preferably entirely, as a functional process within an arithmetic logic unit, in particular as software within a microprocessor, preferably within an analysis unit of the device.

The first and the second sensor elements are preferably assigned to the same surface. In a vehicle seat the sensor elements are advantageously arranged for this purpose on a sensor seat mat which is mounted in a planar manner on the seating surface of a vehicle seat. Since both first sensor signals and second sensors signals can be used in different temperature ranges for the detection of same, the sensor elements are preferably positioned very close to one another spatially so that they are exposed to weight loadings that are as comparable as possible.

Preferably, at least one first sensor element differs from at least one second sensor element in that the absolute value of the first sensor signal of the first sensor element within a weight range to be measured by the device at the same weight loading is always greater by more than the measuring inaccuracy of the device than the absolute value of the second sensor signal of the second sensor element. The different sensitivity of the sensor elements toward weight loadings is consequently already given in principle by the structure of the sensor elements.

The method is performed with the aid of first and second sensor elements which are in each case assigned to a surface of a seat and at which first and second sensor signals respectively can be tapped off electrically, said sensor signals being dependent in each case on the weight force applied to the associated sensor elements. Seat occupancy detection is performed as a function of the ambient temperature either on the basis of the first sensor signals or on the basis of the second sensor signals.

A device conforming to the type already described above is preferably used for this.

The method can preferably execute in multiple ambient temperature ranges, in particular in three ambient temperature ranges, since in this way the computational overhead for interpreting and assigning the sensor signals can be kept low.

The seat occupancy detection is preferably performed in the ambient temperature ranges with the lowest ambient temperatures comparatively based on an analysis of the first sensor signals, in particular if the first sensor elements output comparatively higher sensor signals than the second sensor elements in the temperature range under consideration. Selecting the first sensor elements therefore allows a particularly reliable seat occupancy detection in this ambient temperature range.

Analogously, in an ambient temperature range having the highest ambient temperatures comparatively, the occupant detection is preferably performed based on the second sensor signals, in particular if the second sensor elements have a lower second sensor signal compared to the first sensor elements and as a result the risk of an initial load detection is reduced.

Preferably an inventive method is used wherein initially at least one weight value is formed from at least one first or second sensor signal selected for the occupant detection, then said weight value is compared with a threshold value and a function is triggered if the threshold value is exceeded by the weight value.

In motor vehicles in particular, an especially important and therefore preferred function which is modified or activated as a result of a detected seat occupancy is the deployment behavior of an occupant restraint means in the event of a correspondingly serious vehicle accident. For example, a front, side or knee airbag can then be inflated in a modified manner if necessary in order to protect the detected vehicle occupant.

Other functions can also be triggered as a function of a detected vehicle occupant, however. Specifically in a motor vehicle, this may be, for example, the activation of a warning indication if a seatbelt is not fastened and at the same time a vehicle occupant is detected. Mostly, however, these functions are considered functions of subordinate importance in comparison with the potentially directly live-saving functions related to the deployment of an occupant restraint means. Therefore, when these or similar subordinate functions are activated, use is typically made of a threshold value which has a higher absolute value compared to the threshold value used in the described modification of the deployment behavior of an occupant restraint means.

BRIEF DESCRIPTION OF THE SEVERAL VIEWS OF THE DRAWING

The invention is explained below with reference to several figures, in which:

FIG. 1 shows an exemplary embodiment of a device according to the invention.

DESCRIPTION OF THE INVENTION

Figure 2:
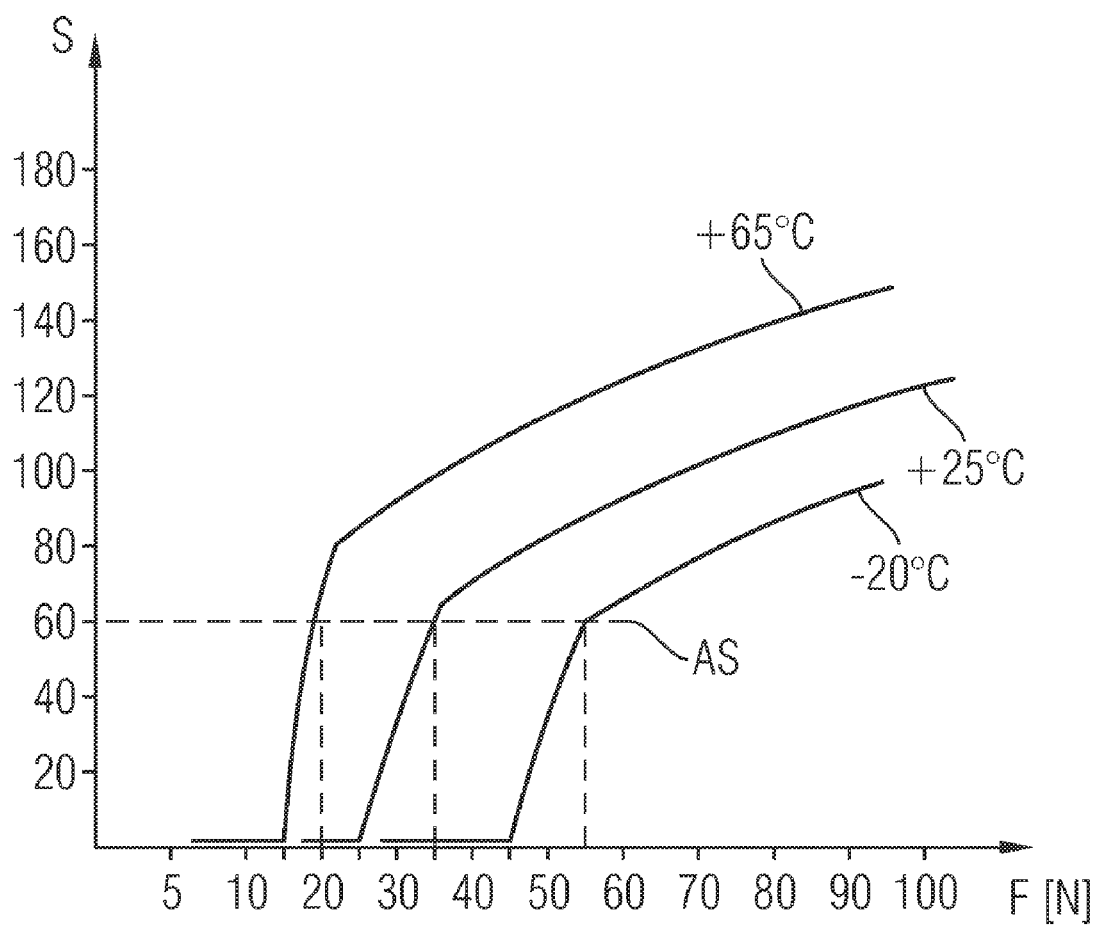
FIG. 2 is a schematic representation of the temperature dependency of the first or second sensor signals.

In the following description the same reference symbols are used throughout the figures to designate the same objects or the same functional relationships.

FIG. 1 shows an exemplary embodiment of a device according to the invention. Disposed on a motor vehicle seat 1 comprising a seating surface 2 and a seat backrest 11 is a sensor seat mat 3 having first weight-sensitive sensor elements A and second weight-sensitive sensor elements B at which a collective sensor signal S can be tapped off by an analysis unit 7, said collective sensor signal S furnishing information about the weight forces F acting on the sensor elements A and B.

Alternatively it is also possible to use a device wherein individual sensor signals S can be tapped off by the analysis unit 7 or also a collective sensor signal S can be tapped off in each case from a plurality of interconnected first or second sensor elements A, B.

The analysis unit 7 is connected to a deployment unit 8 which can effect the deployment of an occupant restraint means 9, a front airbag for example, if signals from impact sensors (not shown), acceleration or pressure sensors for example, allow the presence of an impact accident to be deduced.

FIG. 2 shows a schematic representing the temperature dependency of the first or second sensor signals S. First or second sensor signals S are plotted in arbitrary units on the abscissa, with the force F (expressed in the unit Newton) which acts on a first or second sensor element A, B being plotted on the ordinate.

In the diagram shown, a sensor signal waveform is entered for each of three different temperatures +65° C., +25° C. and −20° C. For all three curves, a minimum force F must first be applied to the corresponding sensor element A, B until a measurable signal S can be tapped off at the sensor element A, B. It is noticeable that said minimum force F is lowest at approx. 15 N and at an ambient temperature T of 65° C., is slightly higher at approx. 25 N at an ambient temperature T of 25° C., and is greatest, at approx. 45 N, at an ambient temperature T of −20° C. This means in the present case that at higher temperatures T already a smaller weight on the sensor elements A, B can result in a vehicle occupant being detected on the vehicle seat. However, this can also lead to the incorrect conclusion, based on an analysis of sensor signals S, that a vehicle occupant is present on the vehicle seat 1 even when only a smaller object has been placed on the vehicle seat 1 or the signal S is caused by tensions in the seat surface 2 under which the sensor seat mat 3 is disposed, for example at seams of the seat surface 2.

Figure 3:
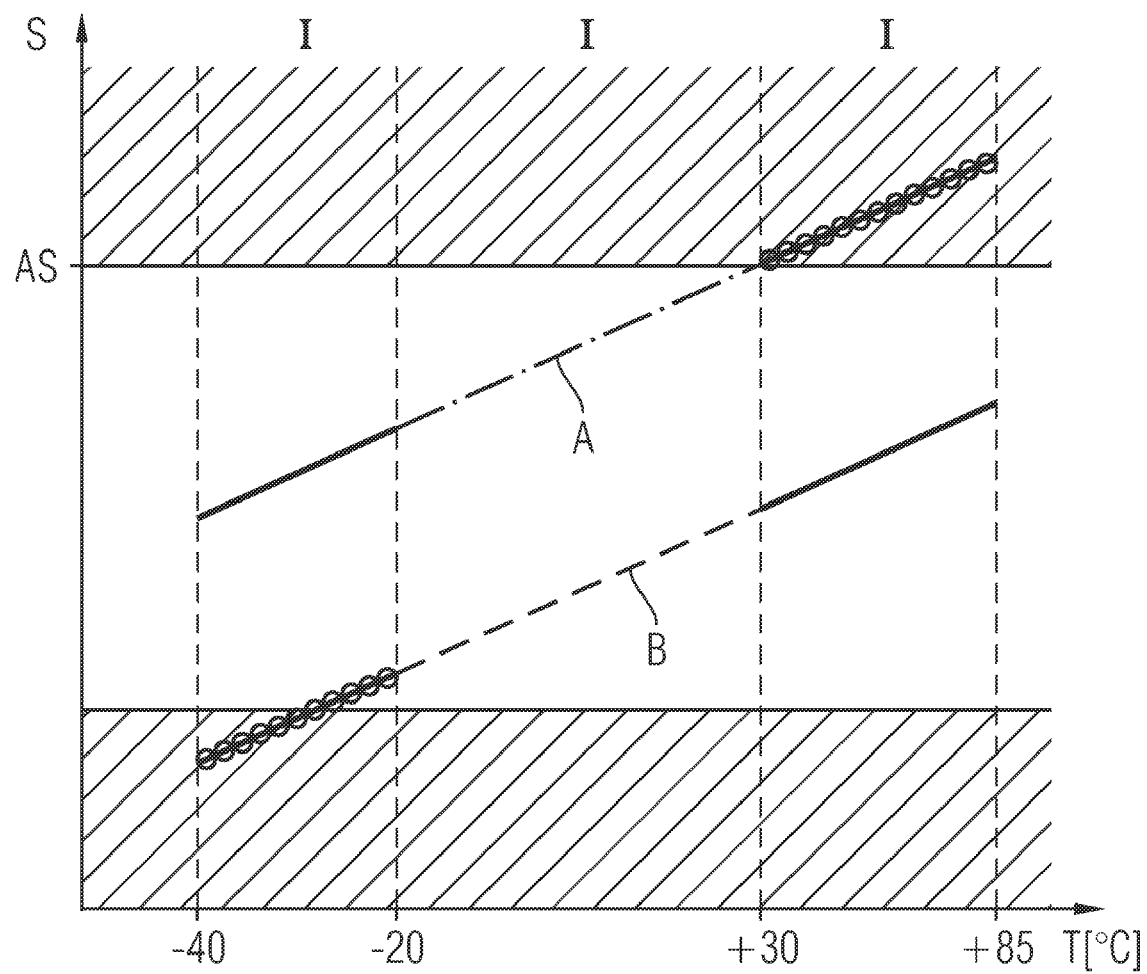
FIG. 3 is a schematic plotting of sensor signals at a constant weight force applied to the sensor elements as a function of the temperature over the temperature.

FIG. 3 shows in a schematic representation possible output values S at a constant weight value F of, for example, 20 N being applied as a function of the temperature T, starting at −40° C. and ranging up to +85° C. The two hatched areas above and below the curves represent areas in which on the one hand too great a sensor signal S leads to a possibly incorrect detection of a vehicle occupant and on the other hand too small a sensor signal S is present for reliable seat occupancy detection.

The curve labeled A is the waveform of first sensor signals S of first sensor elements A. Said first sensor signals S are used for seat occupancy detection; the deployment behavior of an occupant restraint means is influenced as a function thereof. In keeping with the directly vital importance for the protection of the lives of vehicle occupants, the first sensor signals S are comparatively higher than the second sensor signals S of the second sensor elements B, which are used as a basis for triggering a seatbelt warning lamp.

The first sensor signals S lie in the first range I, i.e. at comparatively lower ambient temperatures T, for example in a first ambient temperature range I between −40 and −20° C. and in the second ambient temperature range II between −20 and +30° C., values below a deployment threshold AS.

In a range of very high ambient temperatures III between +30° and +85°, however, the sensor elements A output first sensor signals S which lie in the hatched area above the deployment threshold AS. In this range these sensor signals S cannot be used as a basis for modifying the deployment behavior of an occupant restraint means, because they must be regarded as too unreliable. Rather, the second sensor signals S of the second sensor elements B are preferably used for this purpose in the temperature range III, since in this temperature range III they have a sufficient signal level in order to still guarantee reliable seat occupancy detection.

In a middle temperature range II, the first sensor signals A are used in accordance with their standard assignment: as a basis for influencing the deployment of an occupant restraint means. Similarly, the second sensor signals B are used in this middle ambient temperature range II as the basis for making a decision on the triggering of a seatbelt warning lamp or a seatbelt warning buzzer or for some other subordinate function.

In a temperature range I having very low temperatures T between −40 and −20° C., the second sensor signals B are so low that in this case, often due to measuring inaccuracies during the acquisition of the first and second sensor signals S, it cannot be decided with certainty whether the seat is occupied or not. In this case the higher first sensor signals S are used both for influencing the deployment behavior of the occupant restraint means and for the seatbelt warning function.

The invention claimed is:

1. A device for detecting seat occupancy, comprising:
a plurality of first and second sensor elements assigned to a surface of a seat;
said sensor elements outputting first and second sensor signals, respectively, in dependence on a force of a weight acting on a respective said sensor element; and
a selection circuit connected to receive the sensor signals and effecting an ambient-temperature-dependent selection between the first and the second sensor signals for detecting the seat occupancy.

2. The device according to claim 1, wherein said first sensor elements and said second sensor elements are substantially assigned to a common surface.

3. The device according to claim 1, wherein at least one first sensor element is different from at least one second sensor element in that an absolute value of the first sensor signal of said first sensor element within a weight range to be measured by the device is always greater, at equal weight loading, by more than a measuring inaccuracy of the device, than an absolute value of the second sensor signal of said second sensor element.

4. The device according to claim 1, wherein said sensor elements are disposed in a sensor seat mat.

5. A method of detecting seat occupancy, the method which comprises:
providing first and second sensor elements and assigning said sensor elements to a surface of a seat;

tapping off electrical sensor signals from the sensor elements, the sensor signals having a value dependent on a weight acting on the respective sensor element; and determining, with a hardware analysis unit, the seat occupancy based on the first sensor signals or on the basis of the second sensor signals in dependence on an ambient temperature.

6. The method according to claim 5, which comprises:
carrying out the method in a plurality of ambient temperature ranges; and
detecting the seat occupancy in the ambient temperature range having a comparatively lowest ambient temperature based on the first sensor signals.

7. The method according to claim 6, which comprises carrying out the method in three ambient temperature ranges.

8. The method according to claim 5, which comprises:
carrying out the method in a plurality of ambient temperature ranges; and
detecting the seat occupancy in the ambient temperature range having a comparatively highest ambient temperature based on the second sensor signals.

9. The method according to claim 8, which comprises carrying out the method in three ambient temperature ranges.

10. The method according to claim 5, which comprises the following steps:
forming a weight value from at least one first or second sensor signal selected for occupant detection;
comparing the weight value with a threshold value; and
activating an occupant protection function if the weight value exceeds the threshold value.

11. An occupant-related method in a motor vehicle, the method which comprises:
providing first and second sensor elements and assigning the sensor elements to a surface of a seat, tapping off electrical sensor signals from the sensor elements, the sensor signals having a value dependent on a weight acting on the respective sensor element;
determining, with a hardware analysis unit, a seat occupancy based on the first sensor signals or on the basis of the second sensor signals in dependence on an ambient temperature with a plurality of ambient temperature ranges; and
detecting, with the analysis unit, the seat occupancy in the ambient temperature range having a comparatively lowest ambient temperature based on the first sensor signals;
forming a first weight value from at least one first sensor signal and comparing the first weight value with a first threshold value; and
activating a first occupant protection function if the first weight value exceeds the first threshold value;
detecting the seat occupancy in the ambient temperature range having a comparatively highest ambient temperature based on the second sensor signals;
forming a second weight value from at least one second sensor signal and comparing the second weight value with a second threshold value; and
activating a second occupant protection function if the second weight value exceeds the second threshold value.

12. The method according to claim 11, which comprises setting the first threshold value to have a lower absolute value than the second threshold value.

13. The method according to claim 11, wherein the first occupant protection function includes a modification of a deployment behavior of an occupant restraint device during an accident.

14. The method according to claim 11, wherein the second occupant protection function includes an output of a warning indication to a vehicle occupant if a seatbelt is not fastened.

* * * * *